(12) United States Patent
Fujisawa

(10) Patent No.: US 10,620,691 B2
(45) Date of Patent: Apr. 14, 2020

(54) DATA PROCESSING APPARATUS, INFORMATION PROCESSING METHOD, AND STORAGE MEDIUM

(71) Applicant: CANON KABUSHIKI KAISHA, Tokyo (JP)

(72) Inventor: Minoru Fujisawa, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 15/918,722

(22) Filed: Mar. 12, 2018

(65) Prior Publication Data

US 2018/0203501 A1 Jul. 19, 2018

Related U.S. Application Data

(63) Continuation of application No. 14/855,235, filed on Sep. 15, 2015, now Pat. No. 9,952,653, which is a
(Continued)

(30) Foreign Application Priority Data

Feb. 1, 2012 (JP) .................................. 2012-019995

(51) Int. Cl.
*G06F 1/32* (2019.01)
*H04L 12/12* (2006.01)
(Continued)

(52) U.S. Cl.
CPC .......... *G06F 1/3287* (2013.01); *G06F 1/3234* (2013.01); *H04L 12/12* (2013.01); *Y02D 50/40* (2018.01)

(58) Field of Classification Search
CPC ..... G06F 1/3234; G06F 1/3287; H04L 12/12; Y02D 50/40
See application file for complete search history.

(56) References Cited

U.S. PATENT DOCUMENTS

2006/0039373 A1* 2/2006 Nakamura .............. H04L 12/12
370/389
2010/0235619 A1* 9/2010 Inoue .................. H04L 63/0428
713/151
(Continued)

*Primary Examiner* — Kenneth M Lo
*Assistant Examiner* — Chad G Erdman
(74) *Attorney, Agent, or Firm* — Canon U.S.A., Inc. IP Division

(57) ABSTRACT

A data processing apparatus includes first and second information processing apparatuses. The first information processing apparatus has a first power mode and a second power mode in which electric power consumption is smaller than in the first power mode. The second information processing apparatus is capable of communicating with the first information processing apparatus and an external apparatus via a network. Definition information including identification information identifying a packet received via the network and process information indicating a process to be performed on the packet is received at least from one of the first information processing apparatus and the external apparatus. If a packet is received from the external apparatus in the second power mode, the packet is analyzed to identify definition information corresponding to the packet based on the identification information. A process is performed according to the process information included in the definition information.

6 Claims, 12 Drawing Sheets

Related U.S. Application Data continuation of application No. 13/753,264, filed on Jan. 29, 2013, now Pat. No. 9,164,569.

(51) Int. Cl.
  *G06F 1/3287* (2019.01)
  *G06F 1/3234* (2019.01)

(56) References Cited

U.S. PATENT DOCUMENTS

| | | | |
|---|---|---|---|
| 2011/0078464 A1* | 3/2011 | Yokomizo | G06F 1/3203 713/300 |
| 2011/0235535 A1* | 9/2011 | Furukawa | G06F 1/3203 370/252 |
| 2011/0302278 A1* | 12/2011 | Shim | H04L 12/12 709/219 |
| 2012/0020220 A1* | 1/2012 | Sugita | H04L 63/02 370/235 |

* cited by examiner

FIG. 4

```
<?xml Version="1.0" encoding="utf-8"?>
<D:pattetrn xmlns:D="S3:">
    <D:port>161</D:port>                              ~ 401
    <D:protocol>snmp</D:protocol>                     ~ 402
    <D:id>0</D:id>                                    ~ 403
    <D:state>1</D:state>                              ~ 404
    <D:operation>0</D:operation>                      ~ 405
    <D:overwrite>0</D:overwrite>                      ~ 406
    <D:array>
        <D:offset>0x00</D:offset>                     ~ 407
        <D:value>0x33330000</D:value>                 ~ 408
        <D:mask>0xff21ffff</D:mask>                   ~ 409
    </D:array>
    <D:array>
        <D:offset>0x38</D:offset>
        <D:value> 0x0e760000</D:value>
        <D:mask> 0xffff0000</D:mask>
    </D:array>
    .
    .
</D:pattern>
```

FIG. 5

```
<?xml Version="1.0" encoding="utf-8"?>
  <D:pattetrn xmlns:D="S3:">
    <D:array>
        <D:port>427</D:port>
        <D:protocol>slp</D:protocol>
        <D:comm>1</D:comm>                    ~ 501
        <D:id>0</D:id>
        <D:state>1</D:state>
        <D:overwrite>0</D:overwrite>
        <D:request>1</D:request>              ~ 502
        <D:scope>canon</D:scope>              ~ 503
        <D:type>service:wakeup</D:type>       ~ 504
        <D:operation>1</D:operation>
    </D:array>
    <D:array>
        *
        *
  </D:pattern>
```

FIG. 6

```
<?xml Version="1.0" encoding="utf-8"?>
    <D:pattetrn xmlns:D="S3:">
        <D:array>
                <D:port>161</D:port>
                <D:protocol>snmp</D:protocol>
                <D:comm>0</D:comm>
                <D:id>0</D:id>
                <D:state>1</D:state>
                <D:overwrite>0</D:overwrite>
                <D:request>32</D:request>                          — 601
                <D:scope>public</D:scope>                          — 602
                <D:type>1.3.6.1.2.1.25.3.2.1.2.2</D:type>          — 603
                <D:resval>0</D:resval>                             — 604
                <D:type>1.3.6.1.2.1.25.3.2.1.2.1</D:type>
                        <D:index0>1</D:index0>                     — 605
                <D:index1>21</D:index1>
                <D:index2>3</D:index2>
                <D:operation>0</D:operation>
        </D:array>
        <D:array>
          .
          .
    </D:pattern>
```

FIG. 8

<table>
<tr><td rowspan="13">801</td><td rowspan="13">PATTERN ID</td><td colspan="2">DESTINATION PORT NUMBER</td><td colspan="2">161</td></tr>
<tr><td colspan="2">PROTOCOL NAME</td><td colspan="2">SNMP</td></tr>
<tr><td colspan="2">VALIDITY/INVALIDITY OF PATTERN SETTING</td><td colspan="2">1</td></tr>
<tr><td colspan="2">OPERATION TYPE</td><td colspan="2">0</td></tr>
<tr><td colspan="2">ENABLED/DISABLED FOR PATTERN SETTING UPDATE</td><td colspan="2">0</td></tr>
<tr><td colspan="2">PACKET TYPE</td><td colspan="2">0</td></tr>
<tr><td rowspan="3">PATTERN [0]</td><td>offset</td><td colspan="2">0x00</td></tr>
<tr><td>value</td><td colspan="2">0x33330000</td></tr>
<tr><td>mask</td><td colspan="2">0xff21ffff</td></tr>
<tr><td rowspan="3">PATTERN [1]</td><td>offset</td><td colspan="2">0x38</td></tr>
<tr><td>value</td><td colspan="2">0x0e760000</td></tr>
<tr><td>mask</td><td colspan="2">0xffff0000</td></tr>
<tr><td colspan="2">.</td><td colspan="2">.</td></tr>
<tr><td rowspan="14">802</td><td rowspan="14">PATTERN ID</td><td colspan="2">DESTINATION PORT NUMBER</td><td colspan="2">161</td></tr>
<tr><td colspan="2">PROTOCOL NAME</td><td colspan="2">SNMP</td></tr>
<tr><td colspan="2">VALIDITY/INVALIDITY OF PATTERN SETTING</td><td colspan="2">1</td></tr>
<tr><td colspan="2">OPERATION TYPE</td><td colspan="2">0</td></tr>
<tr><td colspan="2">ENABLED/DISABLED FOR PATTERN SETTING UPDATE</td><td colspan="2">0</td></tr>
<tr><td colspan="2">PACKET TYPE</td><td colspan="2">0</td></tr>
<tr><td rowspan="9">PATTERN [0]</td><td>REQUEST</td><td colspan="2">32</td></tr>
<tr><td>SCOPE</td><td colspan="2">public</td></tr>
<tr><td>TYPE</td><td colspan="2">1.3.6.1.2.1.25.3.2.1.2.1</td></tr>
<tr><td>index[0]</td><td colspan="2">1</td></tr>
<tr><td>index[1]</td><td colspan="2">21</td></tr>
<tr><td>index[2]</td><td colspan="2">3</td></tr>
<tr><td>TYPE</td><td colspan="2">1.3.6.1.2.1.25.3.2.1.2.2</td></tr>
<tr><td>index[0]</td><td colspan="2">0</td></tr>
</table>

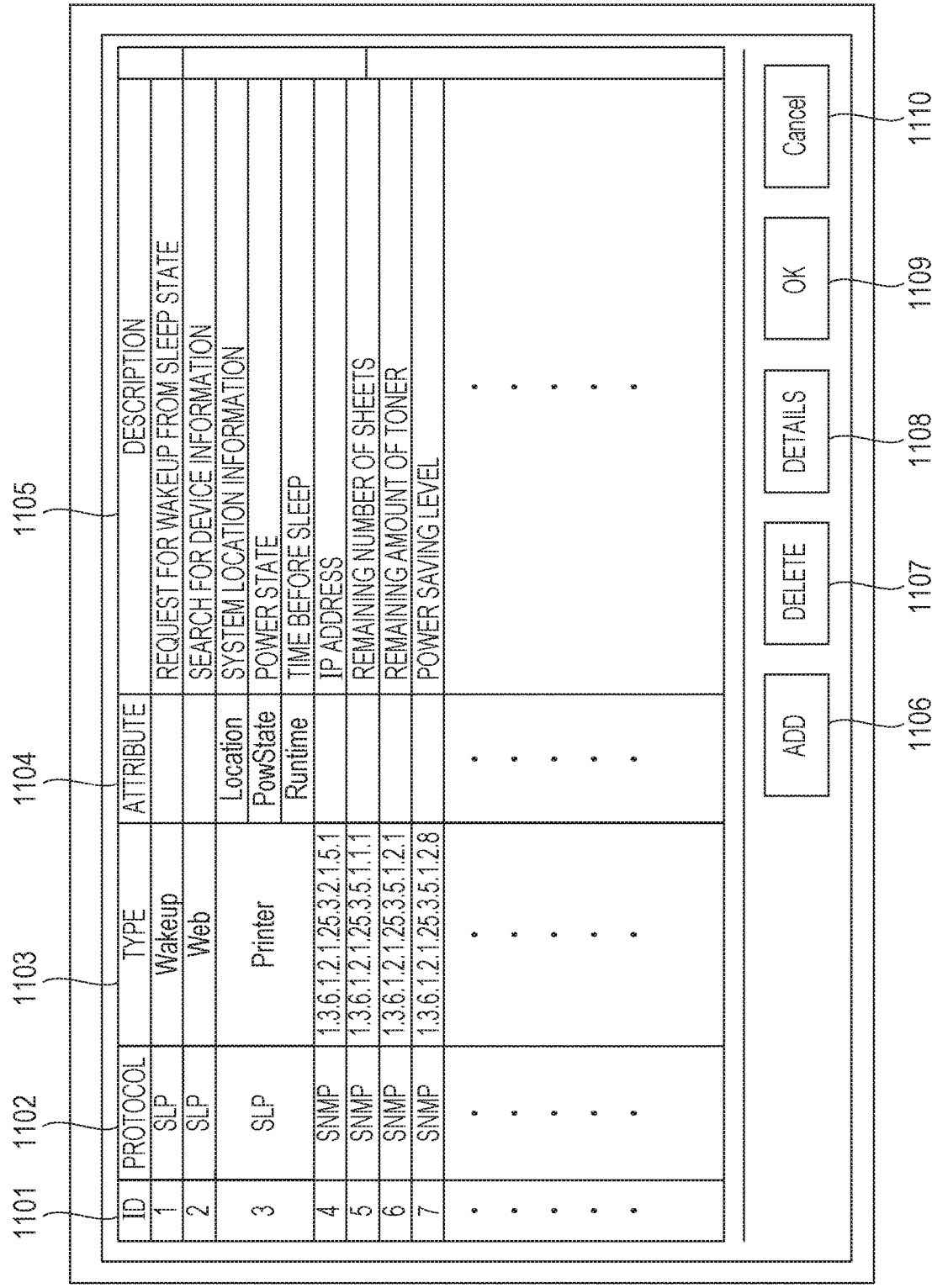

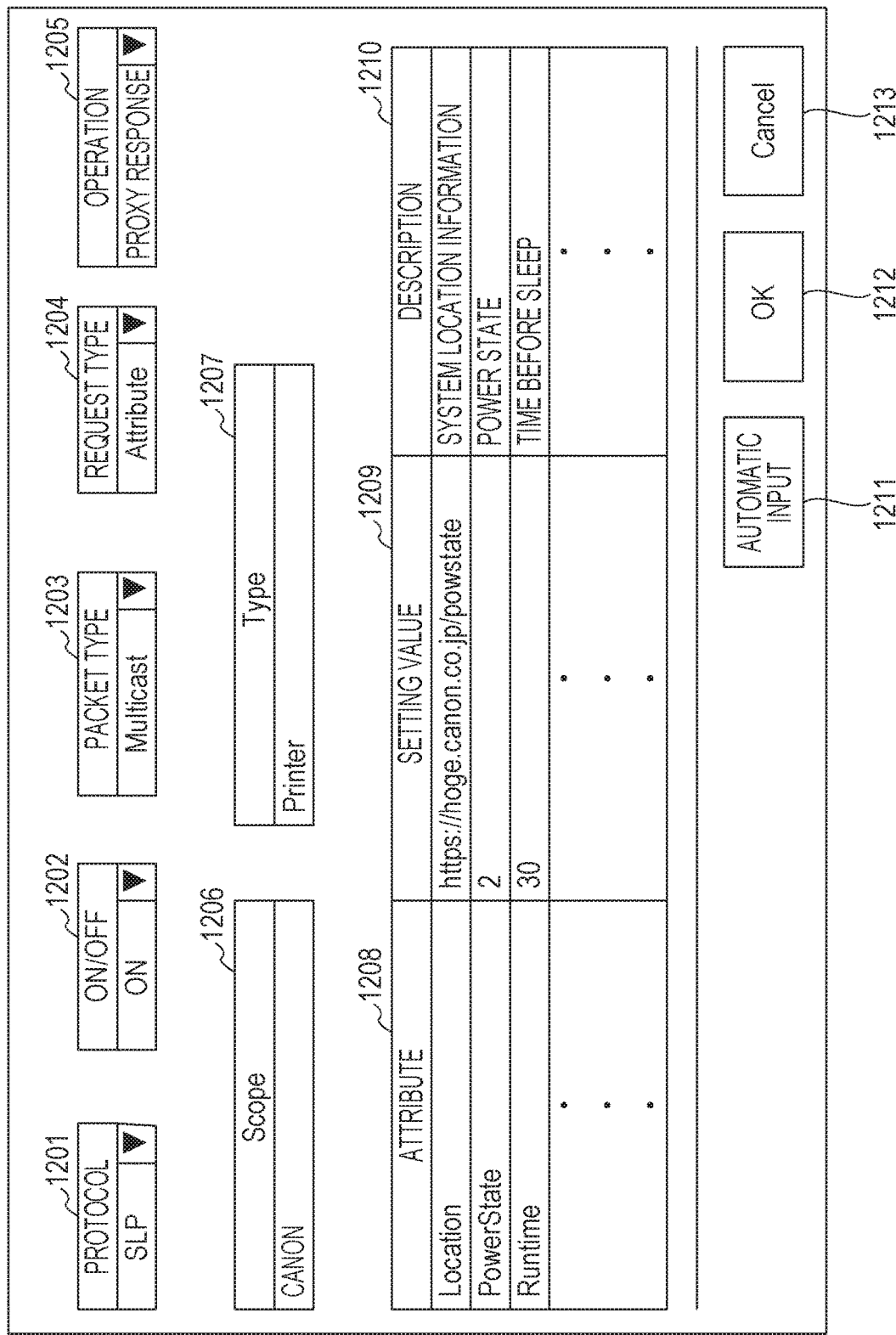

DATA PROCESSING APPARATUS, INFORMATION PROCESSING METHOD, AND STORAGE MEDIUM

CROSS-REFERENCE TO RELATED APPLICATIONS

This application is a continuation of U.S. patent application Ser. No. 14/855,235, presently pending and filed on Sep. 15, 2015, which is a continuation of prior U.S. patent application Ser. No. 13/753,264, filed on Jan. 29, 2013 and issued as U.S. Pat. No. 9,164,569 on Oct. 20, 2015, which claims the benefit of priority from Japanese Patent Application No. 2012-019995 filed Feb. 1, 2012, each of which is hereby incorporated by reference herein in their entireties.

BACKGROUND OF THE INVENTION

Field of the Invention

The present invention relates to a data processing apparatus, an information processing method, and a program.

Description of the Related Art

An information processing system is known which is capable of going into a power saving state to reduce power consumption in a waiting state. Such an information processing system may include, for example, a controller (main controller) including a main CPU and a network controller including a sub CPU. In the power saving state in such a system, supplying electric power to modules in the main controller is stopped, while maintaining supplying normal electric power to modules in the network controller which does not consume much electric power, during a waiting operation. In such a system, when a particular type of packet is received via a network, the network controller may respond to the received packet while maintaining the state in which no electric power is supplied to the main controller thereby achieving a reduction in power consumption. This technique is known as proxy response. A further detailed description of the proxy response technique may be found, for example, in Japanese Patent Laid-Open No. 2008-301077. In the power saving state according to such a conventional proxy response technique, each time the network controller receives a packet, the network controller checks a data pattern of the received packet to determine whether the packet is an ARP (Address Resolution Packet) request packet addressed to the network controller. Furthermore, in the power saving state, whenever the network controller receives a packet, the network controller checks a data pattern of the received packet to determine whether the received packet is a packet (a wakeup packet) which is to be handled by the main controller and thus whether the main controller is to be returned from the power saving mode. In a case where the network controller determines, from the data pattern, that the received packet is an ARP request packet, the network controller transmits, as an ARP response packet, transmission data stored in a transmission data register over a LAN (i.e., the network controller performs proxy response). On the other hand, in a case where it is determined from a data pattern of the received packet that the received packet is a wakeup packet, the network controller outputs a wakeup signal to the main controller to make the main controller return from the power saving mode.

In the conventional technique, a device including a network controller has fixed data indicating various kinds of data patterns used in a pattern matching process to determine a process to be performed, such as a proxy response process, a wakeup process, or the like. On the other hand, a recent trend is to remotely manage many kinds of devices by an application or an OS (Operating System) using a management protocol such as an SNMP (Simple Network Management Protocol) protocol. Thus, packets received by devices are different in type depending on user's devices or operation environments, and therefore it is difficult to predict the type of packets received by the respective user's devices.

Therefore, even when data patterns are registered in advance in devices thereby to determine an operation to be performed, such as a proxy response operation, a wakeup operation, etc., there is a possibility that a device is unpredictably returned from the power saving state without performing proxy response depending on the manner in which the device is operated. Depending on a situation, unexpected matching with a data pattern may occur, which may cause the power saving state to be cancelled unnecessarily. To avoid such an unnecessary operation, all possible data patterns may be registered. However, in the power saving state (a power saving mode in which devices operate with relatively low electric power), a network controller and associated units operate with limited resources to minimize power consumption, and thus it is difficult to register all possible data patterns.

SUMMARY OF THE INVENTION

In view of the above, the invention provides a technique to more properly manage information associated with controlling power modes.

An embodiment provides a data processing apparatus including a first control unit configured to control the data processing apparatus, a registration unit configured to register definition information including identification information and process information, the identification information identifying a packet received from an external apparatus via a network, the process information indicating a process to be performed on the packet, an electric power control unit configured to control supplying of electric power such that electric power is supplied to the first control unit in a normal power mode and supplying of electric power is stopped at least to the first control unit in a power saving mode, and a second control unit configured to, when a packet is received from the external apparatus in the power saving mode, identify definition information corresponding to the packet based on the identification information included in the definition information registered in the registration unit, and then perform a process according to the process information included in the identified definition information, the second control unit being further configured to control registration such that definition information including identification information and process information is newly registered in the registration unit according to an instruction given from the external apparatus, the identification information identifying a packet received from the external apparatus via a network, the process information indicating a process to be performed on the packet.

Note that the invention may also be embodied in a method, a program, a system, a storage medium, etc.

According to embodiments, it is possible to more properly manage information associated with controlling of power modes.

Further features of the present invention will become apparent from the following description of exemplary embodiments with reference to the attached drawings.

BRIEF DESCRIPTION OF THE DRAWINGS

FIG. 4 is a diagram illustrating an example of a set of pattern setting values.

FIG. 5 is a diagram illustrating an example of a set of pattern setting values.

FIG. 6 is a diagram illustrating an example of a set of pattern setting values.

FIG. 8 is a diagram illustrating an example of a pattern list.

FIG. 11 is a diagram illustrating an example of a screen.

FIG. 12 is a diagram illustrating an example of a screen.

DESCRIPTION OF THE EMBODIMENTS

Embodiments of the invention are described below with reference to drawings. Note that the invention is not limited to the embodiments described below. Also note that all parts, elements, or processing steps described in the embodiments are not necessarily needed to practice the invention.

First Embodiment

Figure 1:
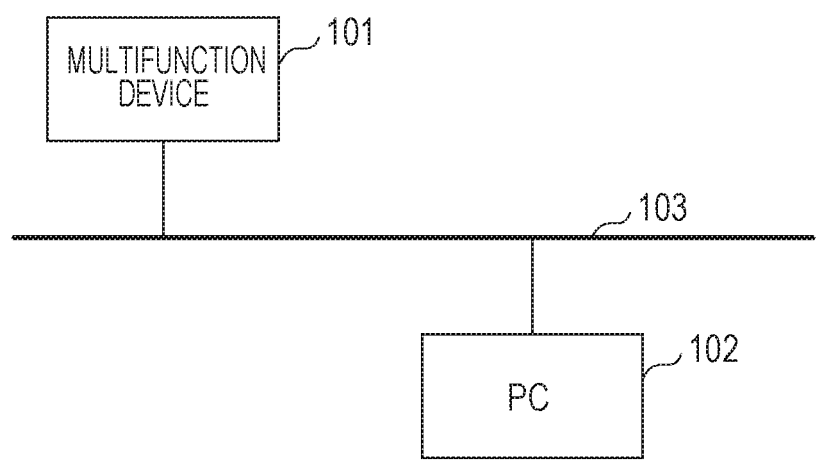
FIG. 1 is a diagram illustrating an example of a network system including a personal computer and a multifunction device.
Figure 2:
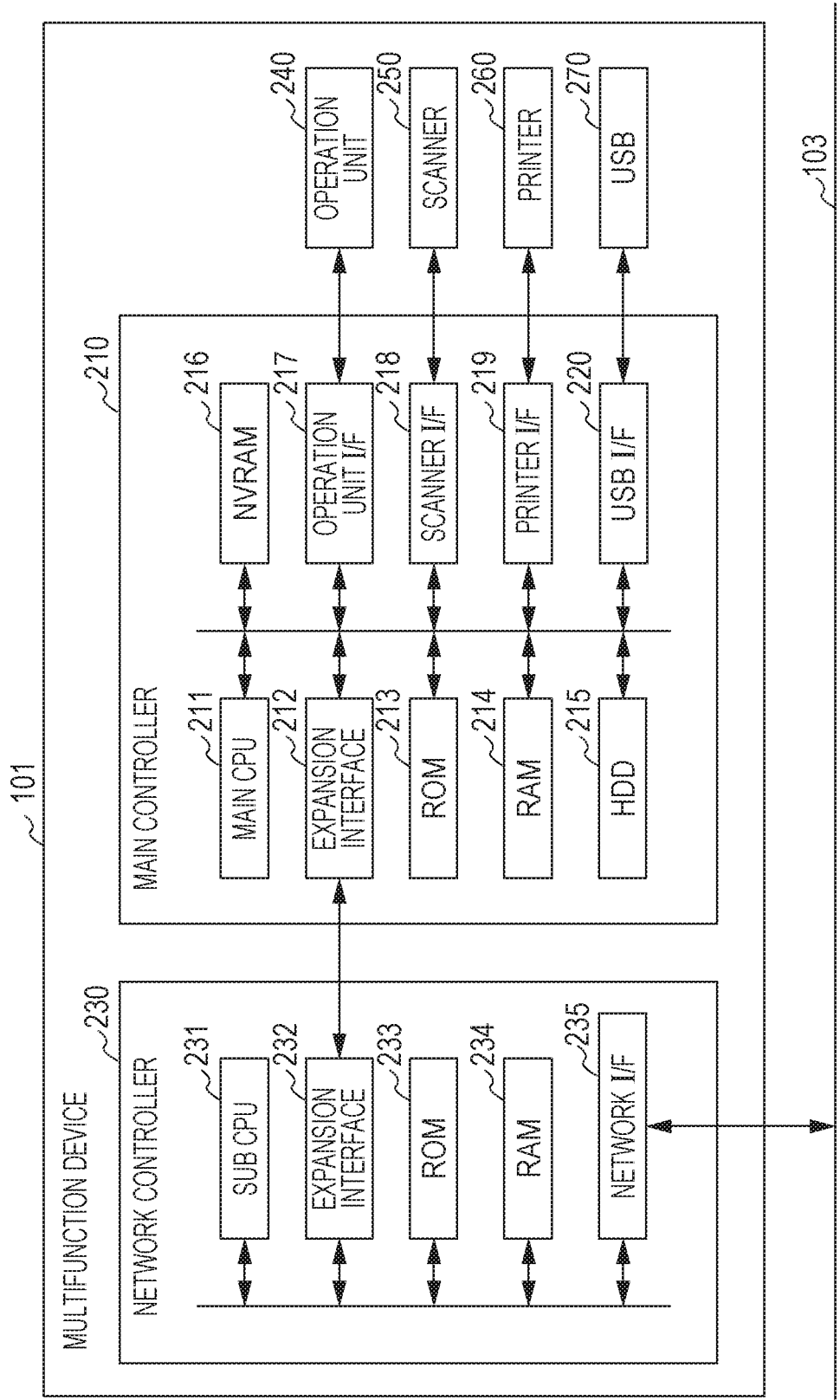
FIG. 2 is a diagram illustrating an example of a configuration of a multifunction device.

In a first embodiment described below, a technique is discussed in terms of maintaining a power saving mode in a multifunction device which is an example of a data processing apparatus. More specifically, a description is given below as to a configuration of a multifunction device and processes including a proxy response process performed in response to receiving a particular type of file or packet from the outside, a process performed in response to inputting of a pattern setting value defining a wakeup process or the like. FIG. 1 is a diagram illustrating an example of a configuration of a network system including a multifunction device 101 and a PC (Personal Computer) 102. The multifunction device 101 and the PC 102 are connected to each other via a network 103 to allow them to communicate with each other. FIG. 2 is a diagram illustrating an example of a hardware configuration of the multifunction device 101. The multifunction device 101 includes a main controller 210 and a network controller 230. The main controller 210 is connected to the network 103 via the network controller 230.

A main CPU 211 executes a software program associated with the main controller 210 to control a whole apparatus (main controller 210). A RAM (Random Access Memory) 214 is used by the main CPU 211 to temporarily store data in controlling the apparatus. A ROM (Read-Only Memory) 213 is used to store a boot program of the apparatus and to store a fixed parameter or the like. An HDD (Hard Disk Drive) 215 is used to store various kinds of data. An NVRAM (Non-Volatile RAM) 216 is used to store various kinds of setting values associated with the main controller 210. An operation unit I/F (InterFace) 217 controls an operation unit 240 to display various operation screens on a liquid crystal panel disposed on the operation unit 240 and transfer a command input via the operation screens to the main CPU 211. A scanner I/F 218 controls a scanner 250. The scanner 250 reads an image on a document and generates image data. A printer I/F 219 controls a printer 260. The printer 260 prints an image on a recording medium according to the image data. A USB (Universal Serial Bus) I/F 220 controls a USB 270. The USB 270 recognizes a nonvolatile USB memory inserted from the outside, and controls, in cooperation with the USB I/F 220, a file system in the USB memory to recognize a file or a directory. An expansion I/F 212 is connected to an expansion I/F 232 of the network controller 230 so as to make it possible to control data communication with an external apparatus (such as the PC 102) on the network 103 via the network controller 230.

A sub CPU 231 executes a software program associated with the network controller 230 to control the whole network controller 230. A RAM (Random Access Memory) 234 is used by the sub CPU 231 to temporarily store data in controlling the network controller 230. A ROM 233 is used to store a boot program of the network controller 230 and to store a fixed parameter or the like. Note that the RAM 234 is also used to store matching data for use in classifying a packet received via the network 103 into one of groups including a group of packets to be discarded, a group of packets to be transferred to the main controller 210, and a group of packets to be responded to in a proxy response mode. The expansion I/F 232 is connected to the expansion I/F 212 of the main controller 210 and the expansion I/F 232 controls data communication between the main controller 210 and the network controller 230. A network I/F 235 is connected to the network 103 and controls data communication between the multifunction device 101 and an external apparatus (such as the PC 102) on the network 103. The main controller 210 is capable of operating in a mode selected from two modes, i.e., a normal power mode (which is an example of a first power mode) or a power saving mode (which is an example of a second power mode) in which power consumption is smaller than in the normal power mode. When the mode is switched from the normal power mode to the power saving mode, supplying of electric power to the main CPU 211, the HDD 215, the NVRAM 216, etc., is stopped. On the other hand, the network controller 230 is realized in an ASIC (Application Specific Integrated Circuit) disposed separately from the main controller 210, and supplying of electric power to the network controller 230 is maintained even after the mode goes into the power saving mode.

Figure 3:
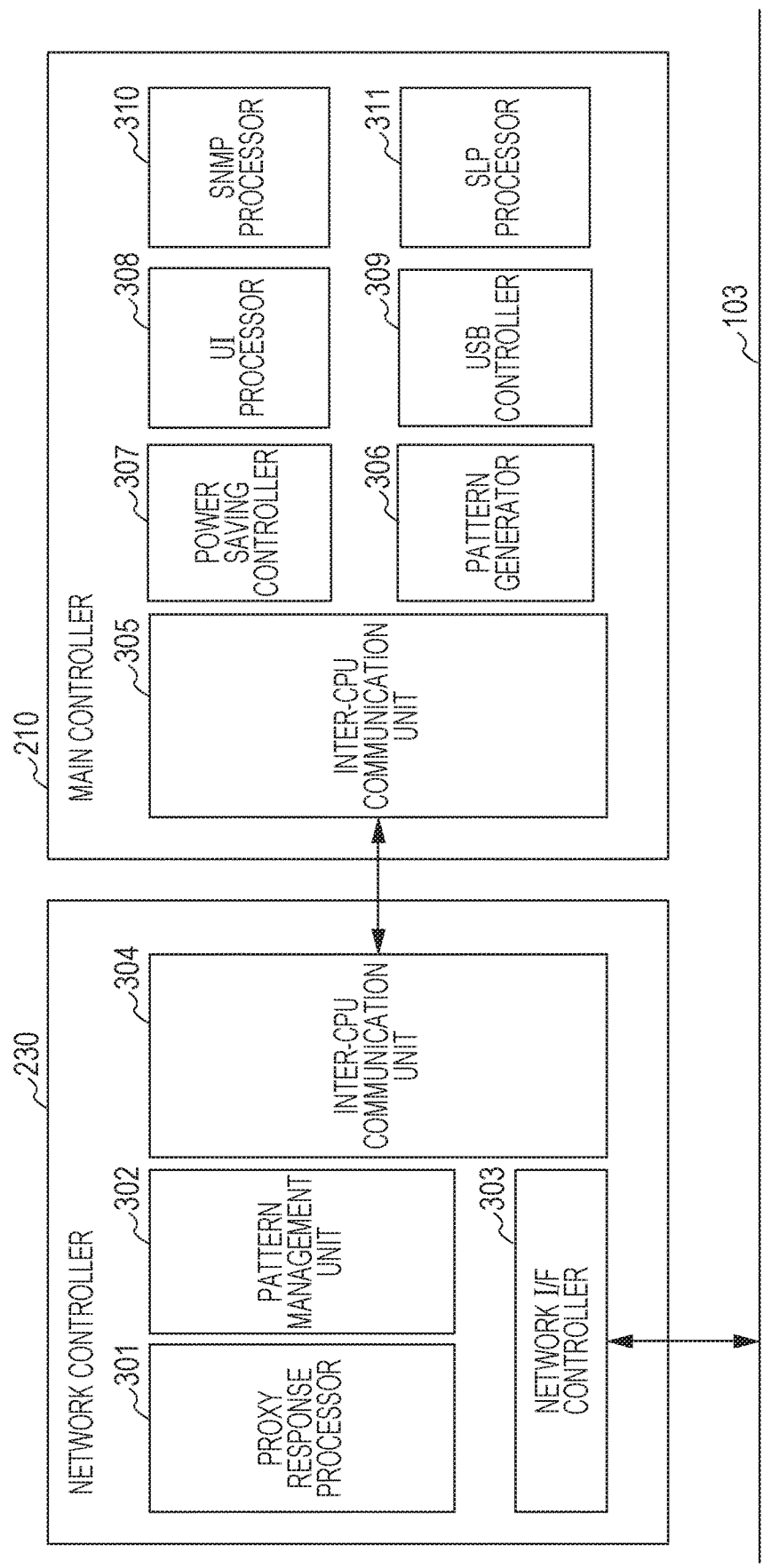
FIG. 3 is a diagram illustrating an example of a software configuration (a configuration of functional units) of a multifunction device.

FIG. 3 is a diagram illustrating an example of a software configuration (functional units) of the multifunction device 101. In FIG. 3, each block provides a function realized by executing software (program) by a controller unit disposed in the multifunction device 101. A power saving controller 307 controls switching between the normal power mode and the power saving mode. An inter-CPU communication unit 305 transmits/receives data to/from functional units of the network controller 230 via the expansion I/F 212 and the expansion I/F 232. An inter-CPU communication unit 304 transmits/receives data to/from functional units of the main controller 210 via the expansion I/F 232 and the expansion I/F 212. A network I/F controller 303 controls a packet transmission/reception operation performed by the network I/F 235. Note that the network I/F controller 303 has information indicating whether the main controller 210 is currently operating in the normal power mode or the power saving mode. In a case where the main controller 210 is currently operating in the normal power mode, the network I/F controller 303 transfers a packet received via the network 103 to the main controller 210. On the other hand, when the main controller 210 is operating in the power saving mode, the network I/F controller 303 transfers a packet received via the network 103 to a proxy response processor 301.

The proxy response processor 301 receives the packet transferred from the network I/F controller 303 in the power saving mode. Note that the proxy response processor 301 receives packets only when the main controller 210 is in the power saving mode. In the normal power mode, packets received by the network I/F controller 303 are transferred to the main controller 210 without being transferred to the proxy response processor 301. The proxy response processor 301 classifies packets received in the power saving mode into three groups, and more specifically, a group of packets to be discarded, a group of packets to be transferred to the main controller 210, and a group of packets to be responded to in the proxy response mode. The classifying is performed based on matching data stored in the ROM 233 or the like.

Packets to be discarded are those which may be ignored (because no response is necessary) as in a case a packet is not addressed to the present apparatus. In a case where a received packet is classified in this group, the received packet is discarded. Packets to be transferred to the main controller 210 are those to be subjected to some process which may be difficult to be performed only by the network controller 230. When a packet of this group is received, the proxy response processor 301 switches the mode of the main controller 210 into the normal power mode from the power saving mode and transfers the received packet to the main controller 210. Packets to be responded to by proxy are those to be responded to by the network controller 230 by proxy for the main controller 210. When a packet of this group is received, the proxy response processor 301 generates a response packet in response to the received packet and transmits the generated response packet to a sender of a request for the response to the packet (i.e., a sender of the packet) on the network 103 via the network I/F controller 303.

A UI processor 308 is configured to receive a pattern setting value from the outside (via the operation unit 240 or the like). The pattern setting value may be information defining a process to be performed on a packet received by the proxy response processor 301 in the power saving mode. The UI processor 308 transfers the pattern setting value input from the outside to a pattern generator 306. A USB processor 309 is configured to acquire a pattern file including a pattern setting value from a file stored in a USB memory inserted from the outside. The USB processor 309 reads out the pattern setting value from the acquired pattern file and transfers the pattern setting value to the pattern generator 306. Based on the pattern setting values received from the UI processor 308 and the USB processor 309, the pattern generator 306 generates a pattern list including one or more pieces of pattern information for use in the process performed by the proxy response processor 301. The pattern list is described in further detail later with reference to FIG. 8. The pattern generator 306 transmits the generated pattern list to a pattern management unit 302 via the inter-CPU communication unit 305 and the inter-CPU communication unit 304. The pattern management unit 302 stores the pattern list in the ROM 233 or the like and manages the pattern list.

The proxy response processor 301 performs a pattern matching process on the packet received from a remote apparatus (PC 102 or the like) via the network I/F controller 303 based on the pattern list acquired from the pattern management unit 302. In the pattern matching process, the proxy response processor 301 determines which group the received packet belongs to, the group of packets to be discarded, the group of packets to be transferred to the main controller 210, or the group of packets to be responded to in the proxy response mode, and the proxy response processor 301 performs a process defined for the group. For example, in a case where the proxy response processor 301 determines in the pattern matching process that the packet is to be responded to by proxy, the proxy response processor 301 generates response data (a response packet) using information described in the received packet and proxy response data included in the pattern information corresponding to the received packet. The proxy response processor 301 transmits the generated response packet to a sender of a request for the response to the packet while maintaining the power saving mode.

An SNMP processor 310 receives an SNMP packet from the PC 102 when the main controller 210 is in the normal power mode, and the SNMP processor 310 analyzes the received SNMP packet and generates a transmission/response packet. The SNMP processor 310 is capable of acquiring various kinds of information managed by the main controller 210 such that the acquired information may be used in generating the transmission/response packet. An SLP processor 311 receives an SLP packet from the PC 102 when the main controller 210 is in the normal power mode, and the SNMP processor 310 analyzes the received SNMP packet and generates a transmission/response packet. The SLP processor 311 is capable of acquiring various kinds of information managed by the main controller 210 such that the acquired information may be used in generating the transmission/response packet. The main controller 210 manages information in terms of, for example, various kinds of setting data used in operating the main controller 210 itself, the number of remaining sheets, and other information which is dynamically updated during the operation of the main controller 210. The information managed by the main controller 210 also includes specifications of parts of the printer 260, the scanner 250, and the like, and information in terms of an exhaustion level, a state, an error, etc. of the parts.

FIG. 4 is a diagram illustrating an example of a set of pattern setting values. The set of pattern setting values includes matching data for use in mainly identifying a received packet, process data defining a process to be performed on the received packet that matches the matching data. Note that in the matching process, a determination is performed as to which pattern information matches the packet based on the matching data and data included in the received packet. The main controller 210 sends a set of pattern setting values such as those illustrated in FIG. 4 to the network controller 230, and the pattern generator 306 generates pattern information including matching data, process data, and the like based on the pattern setting values. Thus, the matching data is an example of identification information for use in identifying a packet, the process data is an example of process information indicating a process to be performed on the packet, and the pattern information (the pattern list) is an example of definition information including identification information and the process information.

Destination port number information 401 includes matching data (a destination port number "161" or the like)

indicating a port number which is a subaddress of a packet. By setting the pattern information to include the destination port number information 401 indicating the destination port number, it becomes possible for the proxy response processor 301 to compare the destination port number of the received packet with the destination port number in pattern information thereby determining whether the packet matches the pattern information. As for the destination port number information 401, a plurality of pieces of destination port number information may be set. In this case, all destination port numbers are included in the pattern information. When a destination port number of a received packet is identical to one of the destination port numbers, it is regarded that the received packet matches the pattern information. Protocol name information 402 includes matching data (a protocol name such as "snmp") indicating a protocol name of a network protocol used in transmitting/receiving the packet. In general, a network protocol is selected depending on the destination port number. Therefore, either a destination port number or a protocol name may be described as a valid setting value.

Pattern ID information 403 indicates an ID used by a pattern management unit 302 in managing a plurality of kinds of pattern information. The proxy response processor 301 determines which piece of pattern information matches the received packet for each pattern ID. Pattern setting validity/invalidity information 404 indicates whether a set of pattern setting values is valid or invalid. The pattern setting validity/invalidity information 404 may be set for each pattern ID. In a case where based on the pattern setting validity/invalidity information 404, the pattern information is set to indicate that a set of pattern setting values is valid, the proxy response processor 301 uses this pattern information in a matching process for a packet received in the power saving mode. On the other hand, in a case where based on the pattern setting validity/invalidity information 404, the pattern information is set to indicate that a set of pattern setting values is invalid, the proxy response processor 301 does not use this pattern information in a matching process for a packet received in the power saving mode. Note that regardless of whether the information described in the pattern information indicates a set of pattern setting values being valid or invalid, the pattern information is held and managed by the pattern management unit 302.

Operation type information 405 includes process data (information such as "0" or the like indicating a process) indicating a type of an operation which is to be performed when it is determined that a received packet matches some pattern information. The operation type information 405 may be set so as to indicate one of types. Operation types settable in the operation type information 405 may include "discarding a received packet (discarding)", "exiting the power saving mode and transferring a received packet to the main controller 210 (transferring)", and "responding, by the network controller 230, to a received packet by proximity for the main controller 210 while maintaining the power saving mode". The operation type information 405 may include information defining an operation of "discarding a received packet and exiting the power saving mode". Pattern setting updating enable/disable information 406 indicates whether it is allowed to update pattern information generated based on a set of pattern setting values. The pattern setting updating enable/disable information 406, indicating whether it is allowed to update pattern information, is used when it is determined whether to allow the pattern information to be overwritten with a new value in the future.

In a case where the pattern setting updating enable/disable information is set to allow overwriting for new pattern information generated based on a new pattern setting value and also for already existing pattern information having the same pattern ID as that of the new pattern information, the already existing pattern information is overwritten with the new pattern information and the already existing pattern information is invalidated. That is, the new information of the pattern setting value is set to be valid. On the other hand, in a case where the pattern setting updating enable/disable information is set not to allow overwriting for new pattern information generated based on a new pattern setting value and also for already existing pattern information having the same pattern ID as that of the new pattern information, the already existing pattern information is not overwritten with the new pattern information. That is, the new information of the pattern setting value is set to be invalid. The pattern setting updating enable/disable information 406 may include "delete" information indicating that pattern information with the same pattern ID is to be deleted. When the "delete" information is set to be asserted for new pattern information generated based on a new pattern setting value, already existing pattern information having the same pattern ID as that of the new pattern information is deleted/invalidated.

Offset information 407 indicates an offset value of a packet. More specifically, the offset information 407 indicates the location, as measured in number of bytes from the start of a received packet, of data to be subjected to the matching process. Pattern matching value information 408 indicates a pattern matching value used in making a confirmation in terms of matching with a received packet. That is, the pattern matching value is used in determining whether matching of data (data of interest) is achieved at the offset location of the received packet. Comparison mask value information 409 indicates a mask value. The comparison mask value information 409 defines a location expressed in bits at which the pattern matching value is compared with data at the offset location in the received packet. In the example illustrated in FIG. 4, an actual pattern matching value is given by a value "0x33210000" obtained as a result of an AND operation between the pattern matching value and the mask value. That is, the determination as to the matching of the pattern information is made depending on whether data at the offset location of the received packet is equal to "0x33210000". Furthermore, as illustrated in FIG. 4, the set of pattern setting values includes a plurality of sets of tables corresponding to respective pattern IDs. Each table set includes three values, i.e., an offset value, a pattern matching value, and a mask value. For a given packet, when all values in a table set are matched, the given packet is regarded as matching pattern information. When even any one of values in a table set is not matched, the packet is regarded as not matching pattern information. Note that the offset value, the pattern matching value, and the mask value are examples of matching data.

FIG. 5 illustrates another example of a set of pattern setting values different from the example illustrated in FIG. 4. A following discussion focuses on differences from the example illustrated in FIG. 4. Packet type information 501 includes matching data indicating a packet type (a packet type "1" in the example illustrated in FIG. 5). The packet types may include a unicast packet, a broadcast packet, and a multicast packet. By setting the pattern information to include packet type information 501 indicating a packet type, it becomes possible to determine whether a received packet matches the pattern information in terms of the packet type. In setting information associated with the protocol, request type information 502, scope information 503, and service type information 504 vary depending on the type of the network protocol. In the example illustrated in FIG. 5, SLP (Service Location Protocol) is used, and thus setting information in terms of the protocol is specific to SLP.

The request type information 502 indicates a request type (such as Service Request, Attribute Request, etc.) of SLP. By setting the pattern information to include the request type information 502 indicating the request type, it becomes possible to determine whether a received packet matches the pattern information in terms of the request type (whether the packet is an SLP packet of the request type of interest). The scope information 503 indicates a scope of SLP. In SLP, in general, a received packet is subjected to processing only when a device of interest is in the specified scope, and packets from devices out of the scope are ignored. By setting the pattern information to include the scope information 503 indicating the scope, it becomes possible to determine whether a received packet matches the pattern information in terms of the scope (i.e., whether the scope is the same as that held by the main controller 210). The service type information 504 indicates a service type of SLP. In general, when a device receives an SLP packet, the device performs processing and/or returns a response according to the service type and the service attribute of the received packet. By setting the pattern information to include the service type information 504 indicating the service type, it becomes possible to determine whether a received packet matches the pattern information in terms of the service type (i.e., whether the service type is the same as that held by the main controller 210).

In FIG. 5, by way of example, the service type information 504 indicating the service type is described in the pattern information. Additionally, a service attribute may be described in the set of pattern setting values to make it possible to check matching in terms of the service attribute. In the example illustrated in FIG. 5, a plurality of pieces of setting information are defined in one set depending on the packet type, the protocol type, etc. for each pattern ID However, for example, as for the service type information 504, a plurality of service types may be defined for each pattern ID.

In the present embodiment, it is determined that a received packet matches pattern information only when the received packet matches the pattern information in terms of all items including the packet type, the protocol type (port number), and the setting information associated with the protocol type with respect to the values described in the pattern information. On the other hand, when even any one of items including the packet type, the protocol type (port number), and the setting information associated with the protocol type of a received packet does not match a corresponding item described in the pattern information, the packet is regarded as not matching the pattern information. Note that the packet type, the request type, the scope, and the service type are examples of matching data.

FIG. 6 is a diagram illustrating still another example of a set of pattern setting values different from the examples illustrated in FIG. 4 and FIG. 5. A following discussion focuses on differences from the examples illustrated in FIG. 4 and FIG. 5. In the setting information of the packet, request type information 601, scope information 602, and service type information 603 vary depending on the type of the network protocol, as with the request type information 502, the scope information 503, and the service type information 504. In the example illustrated in FIG. 6, SNMP (Simple Network Management Protocol) is used, and thus the setting information of the packet is specific to SNMP. The request type information 601 indicates a request type (such as Get Request) of SNMP. By setting the pattern information to include the request type information 601 indicating the request type, it becomes possible to determine whether a received packet matches the pattern information in terms of the request type (whether the packet is an SNMP packet of the request type of interest).

The scope information 602 indicates a scope (community in the present example) of SNMP. In SNMP, in general, when a received packet is processed and responded to only when a device of interest is in the specified community, and packets from devices in different communities are ignored. By setting the pattern information to include the scope information 602 indicating the scope, it becomes possible to determine whether a received packet matches the pattern information in terms of the scope (i.e., whether the community is the same as that held by the main controller 210). The service type information 603 indicates a service type (object ID) of SNMP. Object information 604 indicates information corresponding to the service type information 603. As for the service type information 603, a plurality of service types may be defined for each pattern ID. As for the object information 604, a plurality of pieces of information may be described as index values. In general, when a device receives an SNMP packet, the device performs processing and responding for information corresponding to an object ID described in the received packet.

By setting the pattern information to include the service type information 603 indicating the service type, it becomes possible to determine whether a received packet matches the pattern information in terms of the service type (i.e., whether the object ID is the same as that held in the main controller 210). For example, when a received packet is determined to match certain pattern information, if the pattern information indicates that "proxy response" is specified as the operation type, the information of the object information 604 is transmitted to a sender of the present packet. In a case where there are two or more pieces of information corresponding to the object ID, the index 605 indicates each index and information corresponding to the index. When a received packet is determined to match certain pattern information, if there is an object ID and there is a corresponding index, information specified by the index 605 is transmitted to a sender of the present packet. However, as with the information specified by the object information 604, the information is transmitted only when the pattern information indicates that "proxy response" is specified as the operation type. Note that the request type, the scope, and the service type are examples of the matching data.

Figure 7:
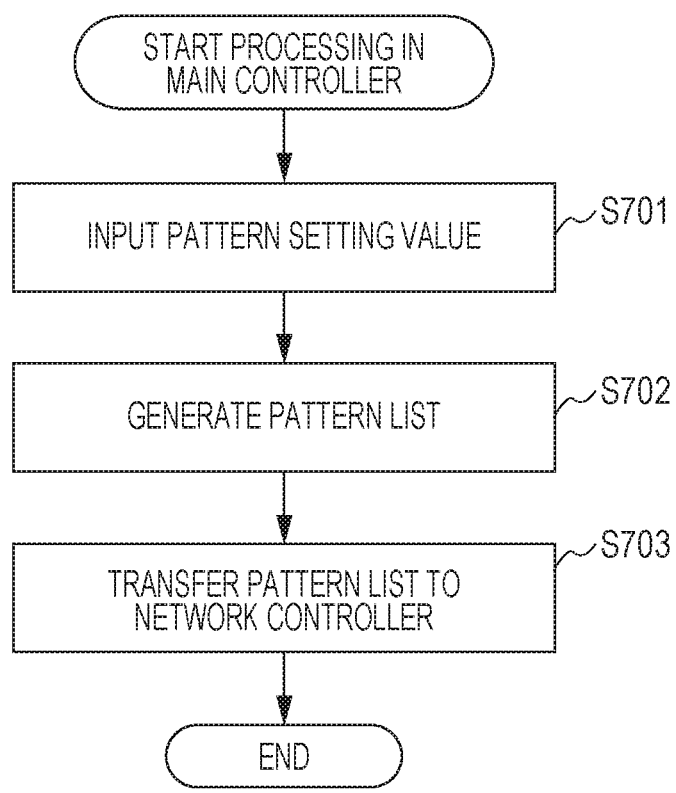
FIG. 7 is a flow chart illustrating an example of an import process.

FIG. 7 is flow chart illustrating an example of a process (an import process) performed in a case where a set of pattern setting values such as that illustrated in FIG. 4, FIG. 5, or FIG. 6 is input from the USB 270 to the main controller 210. A program and data used in the process illustrated in the flow chart are stored in the ROM 213 or the like, and the program and the data are read out into the RAM 214 and executed by the main CPU 211. When a set of pattern setting values is input from the USB 270, then, in step S701, the main CPU 211 reads out the input set of pattern setting values (a pattern file) from the USB 270. The set of pattern setting values read in this step is, for example, such as that illustrated in FIG. 4, FIG. 5, for FIG. 6. Next, in step S702, the main CPU 211 analyzes the pattern setting values read out from the USB 270 and generates a pattern list (FIG. 8). In step S703, the main CPU 211 transfers the generated pattern list to the network controller 230 via inter-CPU communication. FIG. 8 illustrates an example of a pattern list generated by the main CPU 211. Pattern information 801 is an example of a pattern list generated in step S702 by the main CPU 211 based on the set of pattern setting values illustrated in FIG. 4. Pattern information 802 is an example of a pattern list generated in step S702 by the main CPU 211 based on the set of pattern setting values illustrated in FIG. 6.

Figure 9:
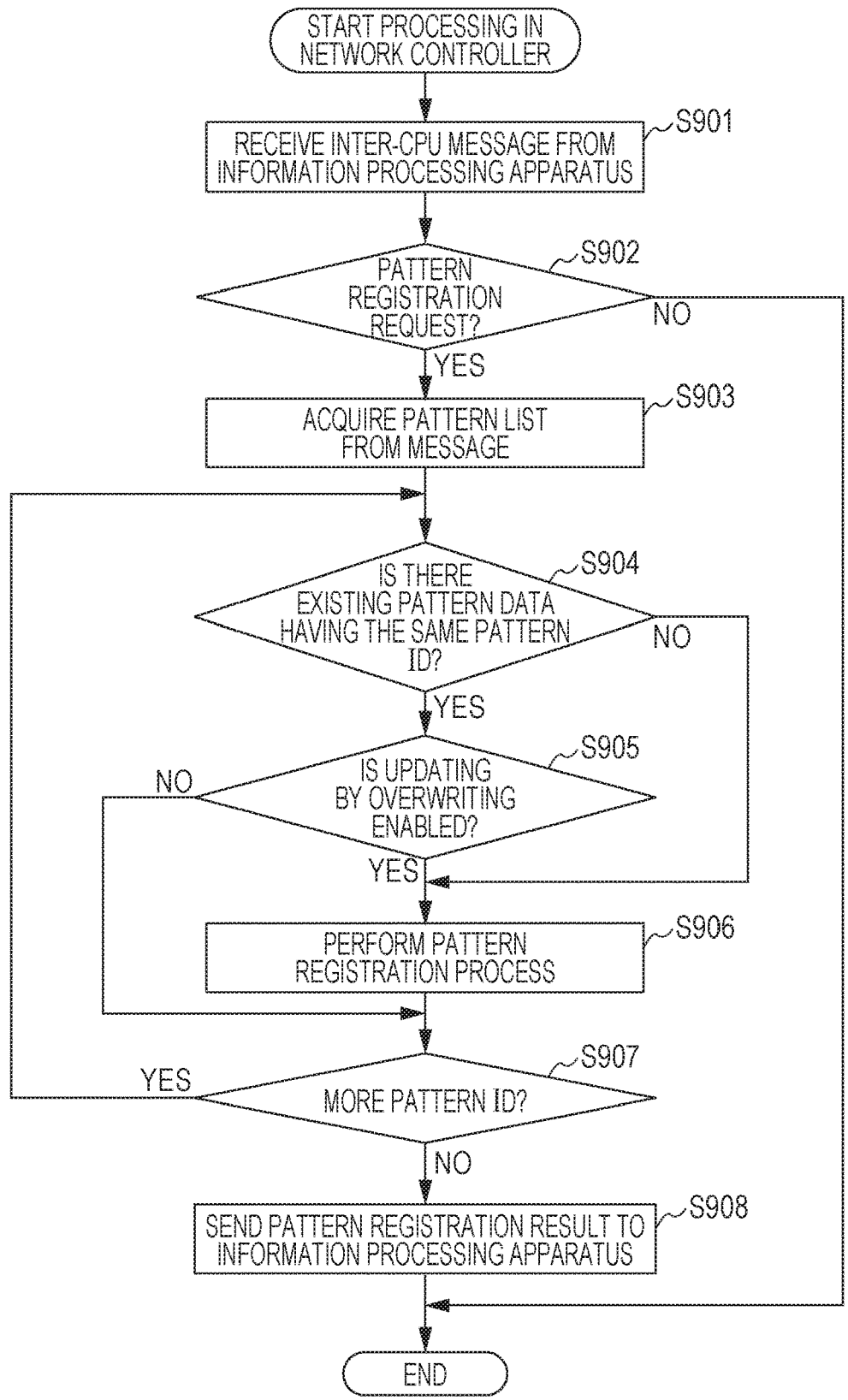
FIG. 9 is a flow chart illustrating an example of a process performed in response to receiving a message.

FIG. 9 is a flow chart illustrating an example of a process (a process performed in response to receiving a message) performed by the network controller 230 when a pattern list is transmitted, in step S703, to the network controller 230. A program and data used in the process illustrated in the flow chart are stored in the ROM 233 or the like, and the program and the data are read out into the RAM 234 and executed by the sub CPU 231. In step S901, the sub CPU 231 receives, via inter-CPU communication, the pattern list transmitted in step S703 from the main controller 210. In step S902, the sub CPU 231 checks whether the received inter-CPU message is a message (registration request) requesting registration of a pattern list. In a case where the sub CPU 231 determines that the received message is not a registration request, the process is ended. On the other hand, in a case where it is determined that the received message is a registration request, the process proceeds to step S903. In step S903, the sub CPU 231 acquires the pattern list received in step S901. In step S904, the sub CPU 231 acquires one pattern ID from the acquired pattern list and checks it with respect to pattern list stored in the RAM 234. More specifically, the sub CPU 231 checks whether the pattern list stored in the RAM 234 includes a pattern ID that is the same as the acquired pattern ID. In a case where the sub CPU 231 determines that there is no identical pattern ID, the process proceeds to step S906. On the other hand, in a case where the sub CPU 231 determines that there is an identical pattern ID, the process proceeds to step S905.

In step S905, the sub CPU 231 checks whether the pattern setting updating enable/disable information in pattern information of the identical ID in the pattern list stored in the RAM 234 is set to enable updating of the pattern information. More specifically, for example, the sub CPU 231 checks whether the "pattern setting updating enable/disable information" has an attribute of "1" or "0". In a case where the sub CPU 231 determines that updating is not allowed (i.e., when the "pattern setting updating enable/disable information" has an attribute of "0"), the process proceeds to step S907. On the other hand, in a case where the sub CPU 231 determines that updating is allowed (i.e., when the "pattern setting updating enable/disable information" has an attribute of "1"), the process proceeds to step S906. In step S906, the sub CPU 231 adds pattern information identified by the acquired one pattern ID to the pattern list stored in the RAM 234. In a case where the pattern information is overwritten, the overwritten is performed for the pattern information identified by the identical pattern ID. In step S907, the sub CPU 231 checks whether the pattern list acquired in step S903 includes more pattern IDs (unchecked pattern IDs) other than those already checked in step S904. In a case where the sub CPU 231 determines that there is an unchecked pattern ID, the sub CPU 231 repeats the process from step S904 for the unchecked pattern ID. On the other hand, in a case where the sub CPU 231 determines that there is no more unchecked pattern IDs, the process proceeds to step S908. In step S908, the sub CPU 231 transmits a result of the registration to the pattern list to the main controller 210 via inter-CPU communication. The main CPU 211 receives the registration result via inter-CPU communication and displays the result on the operation unit 240.

Figure 10:
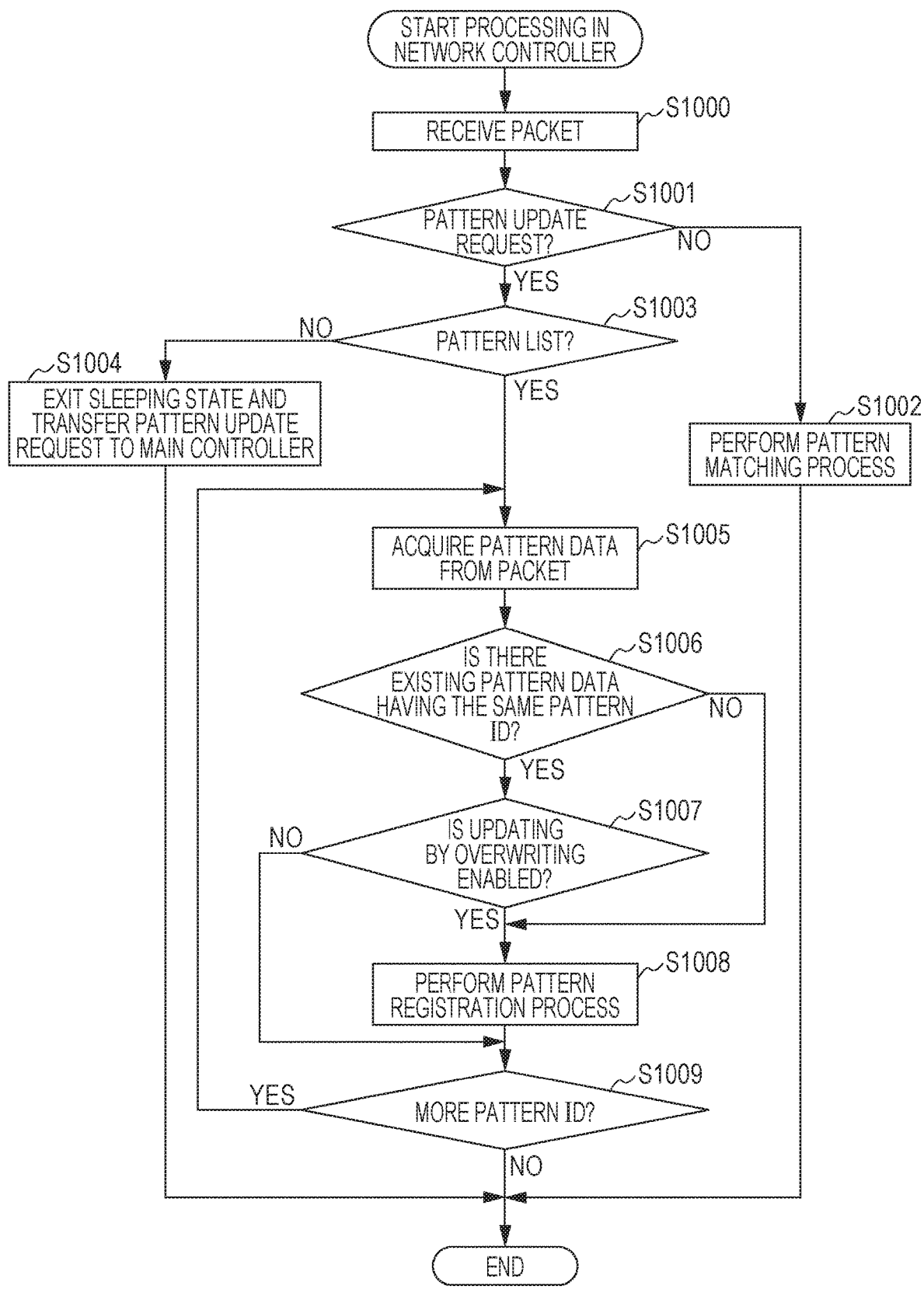
FIG. 10 is a flow chart illustrating an example of a process performed in response to receiving a packet.

The PC 102 is capable of transmitting a pattern list via a network transfer operation using a tool, FTP, Web-based service, or the like. The PC 102 is also capable of transmitting a pattern list update request together with a set of pattern setting values such as that illustrated in FIG. 4, FIG. 5, or FIG. 6. FIG. 10 is a flow chart illustrating a process (a process performed in response to receiving a packet) performed by the network controller 230 for a packet (a pattern list update request or the like) transmitted from a remote apparatus (such as the PC 102) when the main controller 210 is in the power saving mode. A following discussion focuses on differences between the process of the flow chart illustrated in FIG. 10 and the process of the flow chart illustrated in FIG. 9. In the case of the process of the flow chart illustrated in FIG. 9, the process is performed in the normal power mode when a pattern list is received from the main controller 210 via the expansion I/F 232. On the other hand, the process of the flow chart illustrated in FIG. 10 is different from that illustrated in FIG. 9 in that the process is performed in the power saving mode when a pattern list is received from the PC 102 via the network I/F 235. A program and data used in the process illustrated in the flow chart are stored in the ROM 233, and the program and the data are read out into the RAM 234 and executed by the sub CPU 231. First, when sub CPU 231 receives, in the power saving mode, a packet from the PC 102 in step S1000, the process proceeds to step S1001. In step S1001, the sub CPU 231 checks whether the packet received via the network I/F 235 is a pattern list update request. In a case where the sub CPU 231 determines that the received packet is not an update request, the process proceeds to step S1002. On the other hand, in a case where it is determined that the received packet is an update request, the process proceeds to step S1003. In step S1002, the sub CPU 231 acquires the pattern list from the ROM 233 or the like and performs a pattern matching process. More specifically, in a case where the sub CPU 231 there is matched pattern information, the sub CPU 231 determines which operation of "discarding", "transferring", and "responding by proxy" is specified as the operation type, and performs the determined operation. On the other hand, in a case where the sub CPU 231 there is no matched pattern information, the received packet is, for example, discarded.

In step S1003, the sub CPU 231 acquires data attached to the received packet, and checks whether the data is a pattern list or a set of pattern setting values such as that illustrated in FIG. 4, FIG. 5, or FIG. 6. In a case where the sub CPU 231 determines that the data is a set of pattern setting values, the process proceeds to step S1004. On the other hand, in a case where the sub CPU 231 determines that the data is a pattern list, the process proceeds to step S1005. In step S1004, the sub CPU 231 controls the main controller 210 to return to the normal power mode from the power saving mode and transfers the set of pattern setting values acquired from the packet to the main controller 210 via inter-CPU communication. Note that the main CPU 211 processes the received set of pattern setting value according to the flow chart illustrated in FIG. 7.

In step S1005, the sub CPU 231 extracts a pattern list from the packet received in step S1000. In step S1006, the sub CPU 231 acquires one pattern ID from the obtained pattern list, and checks whether the pattern list stored in the sub CPU 231 includes a pattern ID that is identical to the acquired one pattern ID. In a case where the sub CPU 231 determines that there is no identical pattern ID, the process proceeds to step S1008. On the other hand, in a case where the sub CPU 231 determines that there is an identical pattern ID, the process proceeds to step S1007. In step S1007, the sub CPU 231 checks whether the pattern setting updating enable/disable information in pattern information of the identical ID in the pattern list stored in the RAM 234 is set to enable updating of the pattern information. In a case where the sub CPU 231 determines that updating is not allowed, the process proceeds to step S1009. On the other hand, in a case where the sub CPU 231 determines that updating is allowed, the process proceeds to step S1008.

In step S1008, the sub CPU 231 registers pattern information identified by the acquired one pattern ID in the pattern list stored in the sub CPU 231. In a case where the pattern information is overwritten, the overwritten is performed for the pattern information identified by the identical pattern ID. In step S1009, the sub CPU 231 checks whether the acquired pattern list includes more pattern IDs (unchecked pattern IDs) other than those already checked in step S1005. In a case where the sub CPU 231 determines that there is an unchecked pattern ID, the sub CPU 231 repeats the process from step S1005 for the unchecked pattern ID. On the other hand, in a case where the sub CPU 231 determines that there is no more unchecked pattern IDs, the process proceeds to step S1009. In step S1009, the sub CPU 231 transmits a result of the registration of the pattern list to a sender of the packet (PC 102) via the network I/F 235.

When a request for updating of a pattern list is issued when the main controller 210 is in the normal power mode, the request is handled as follows. First, the network I/F 235 transfers the request for updating of the pattern list to the main CPU 211 via inter-CPU communication. The main CPU 211 acquires data attached to the received update request, and checks whether the acquired data is a pattern list or a set of pattern setting values such as that illustrated in FIG. 4, FIG. 5, or FIG. 6. In a case where the main CPU 211 determines that the data is a pattern list, the main CPU 211 perform the process in step S703 to transfer the pattern list to the sub CPU 231 of the network controller 230. On the other hand, in a case where the main CPU 211 determines that the data attached to the received update request is a set of pattern setting values such as that illustrated in FIG. 4, FIG. 5, or FIG. 6, the main CPU 211 performs the processes in step S702 and S703. By performing these processes, the main CPU 211 generates a pattern list from the set of pattern setting values and transmits the generated pattern list to the network controller 230.

According to the present embodiment, as described above, it is possible to change a pattern list used to control proxy response or the like depending on user's operation environments. This makes it possible to prevent the power saving mode from being unnecessarily cancelled. In other words, it becomes possible to properly maintain the power saving mode. Furthermore, according to the embodiment described above, it becomes possible to update a pattern list by the network controller 230 while maintaining the main controller 210 in the power saving mode. This makes it possible to perform a pattern matching process for a received packet using a newest pattern list while maintaining the power saving mode, and thus it becomes possible to properly maintain the power saving mode.

Second Embodiment

In a second embodiment described below, a discussion is given as to inputting of a pattern setting value via the operation unit 240. In the following description of the second embodiment, the description focuses on differences from the first embodiment described above. In the present embodiment, it is assumed by way of example that a pattern list held by the network controller 230 is read out and displayed on a screen of the operation unit 240 to allow the pattern list to be updated or registered. Note that the process may be performed differently. For example, a process may be performed simply to register a pattern setting value.

FIG. 11 illustrates an example of a screen for use in defining a set of pattern setting values. In a field in a pattern ID column 1101, a pattern ID is uniquely defined for each piece of pattern information. In a field of a protocol type column 1102, a protocol type of a packet to be subjected to a pattern matching process is described. In FIG. 11, by way of example, a protocol name is used to describe the protocol type in the protocol type column 1102. Alternatively, a port number may be used. In a field in a service type column 1103, a service type requested by the PC 102 is described. For example, when SLP is defined in a filed in the protocol type column 1102, a service type described in a corresponding field in the service type column 1103 specifies the service type of SLP. On the other hand, in a case where SNMP is defined in a field in the protocol type column 1102, a service type described in a corresponding field in the service type column 1103 specifies an object ID (OID). In a field in a detailed attribute column 1104, a detailed attribute field or index is defined for the service type defined in a corresponding field in the service type column 1103. In a field in a description column 1105, a description of the detailed attribute of a corresponding service type is described.

An add button 1106 is a user interface (UI) used to add pattern information (set of pattern setting values). If the add button 1106 is clicked, the screen is changed to a screen illustrated in FIG. 12, which will be described in detail later. A delete button 1107 is a UI used to delete pattern information. If the delete button 1107 is clicked in a state in which one or a plurality of pieces of pattern information is selected in a list illustrated in FIG. 11, the selected pattern information is deleted from the screen. A details button 1108 is a UI used to display details of pattern information. If the details button 1108 is clicked, the screen is changed to the screen illustrated in FIG. 12, which will be described in detail later. An OK button 1109 is used to register pattern information defined on the screen illustrated in FIG. 11 or FIG. 12 via an operation performed by a user. The OK button 1109 is also used to make a final decision on performing an operation such as deleting of pattern information. If the OK button 1109 is clicked, then, for example, a UI processor 308 transfers the defined information as a set of pattern setting values to the pattern generator 306. A process performed after that is similar to that according to the first embodiment described above with reference to FIG. 7 or FIG. 9, and thus a further description thereof is omitted. A cancel button 1110 is a UI to completely cancel setting or deleting of information input by a user on the screen illustrated in FIG. 11 or FIG. 12.

FIG. 12 illustrates an example of a screen which appears when the add button 1106 or the details button 1108 is clicked. This screen is used to add new pattern information (pattern setting value) or to change details of pattern information displayed on the screen illustrated in FIG. 11. A protocol type selection box 1201 is a UI used to select a protocol type of a packet to be subjected to a pattern matching process. In the example illustrated in FIG. 12, the protocol type box 1201 is configured such that a user is allowed to select a protocol name. Alternatively, the protocol type selection box 1201 may be configured such that a user is allowed to input a port number of a protocol. A pattern setting validate/invalidate box 1202 is a UI used to selectively set the pattern setting values disposed in FIG. 12 to be valid or invalid. A packet type selection box 1203 is a UI used to select information used in determining a type of a packet transmitted from the PC 102. In the packet type selection box 1203, it is possible to select one of packet types including unicast, multicast, and broadcast. A request type selection box 1204 is a UI used to select a request type for each protocol type. For example, when the protocol type is SLP, a Service Request, an Attribute Request, etc. may be selected using the request type selection box 1204. On the other hand, for example, when the protocol type is SNMP, the request type selection box 1204 may be used to select a Get Request, etc.

An operation type selection box 1205 is a UI used to select an operation to be performed by the network controller 230 when a packet received from the PC 102 in the power saving mode matches pattern information. In the operation type selection box 1205, it is allowed to select one of operations, "discarding", "transferring", and "responding by proxy". A scope input box 1206 is a UI used to input a scope of service to be provided in response to a request from the PC 102. For example, when SLP is defined in a filed in the protocol type column 1201, a service scope of SLP is input in the scope selection box 1206. On the other hand, for example, when the protocol type described in the protocol type column 1201 is SNMP, a community name is input in the scope selection box 1206. A service type input box 1207 is a UI used to input a service type of service to be provided in response to a request from the PC 102. For example, when the protocol type described in the protocol type column 1201 is SLP, a service type of SLP may be input in the service type input box 1207. On the other hand, when the protocol type described in the protocol type column 1201 is SNMP, an OID may be input. A detailed attribute input column 1208 is a UI used to input a detailed attribute or an index of a service type input box 1207. A setting value input column 1209 is a UI used to input a value or information for each detailed attribute described in the detailed attribute input column 1208 for the service type input in the service type input box 1207. A description input column 1210 is a UI used to input a description of each detailed attribute of the service type input in the service type input box 1207.

An automatic input button 1211 is a UI used to enable automatic inputting in setting columns in FIG. 12. If the automatic input button 1211 is clicked, the pattern generator 306 acquires various kinds of information about the multifunction device 101 from the SNMP processor 310, the SLP processor 311, etc., in terms of setting data, the number of remaining sheets, specifications of parts, and information in terms of an exhaustion level, a state, an error, etc. of the parts. The pattern generator 306 transfers the acquired information to the UI processor 308. The UI processor 308 displays the information received from the pattern generator 306 in the respective setting boxes or like in FIG. 12. The automatic input button 1211 is usable in a state in which a protocol type and a service type have already been input in the protocol type input box 1201 and the service type input box 1207, respectively. When the automatic input button 1211 is clicked, automatic inputting is performed at least for the packet type input box 1203, the scope input box 1206, the detailed attribute input column 1208, and the setting value input column 1209.

An OK button 1212 is a UI used to temporarily store the information input in FIG. 12. The information input in the respective setting boxes in FIG. 12 is registered in the network controller 230 when and only when the OK button 1109 is clicked. A cancel button 1213 is a UI used to discard all information input in FIG. 12. By providing the UIs in the above-described manner, it becomes possible to reduce labor of an operator of the device in inputting a set of pattern setting values. The screens illustrated in FIG. 11 and FIG. 12 may be displayed on the PC 102 to make it possible to input a set of pattern setting values using the PC 102. The UIs configured in the above-described manner are useful in particular to register a pattern list used in a pattern matching process in the power saving mode.

Other Embodiments

The main controller 210 described above is a first information processing apparatus (an example of a first computer), and the network controller 230 is a second information processing apparatus (an example of a second computer).

The embodiments described above make it possible to more properly manage information associated with controlling of power modes.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A printing apparatus comprising:
a storing unit configured to store a response pattern indicating a packet to which the printing apparatus is capable of responding while being maintained in a power saving mode;
a processing unit configured to, in a case where a packet that the printing apparatus operating in the power saving mode has received matches the response pattern, respond to the received packet while being maintained in the power saving mode;
a receiving unit configured to receive an editing request via a network from an external apparatus, wherein the editing request received via the network is a request for editing the response pattern stored in the storing unit; and
an editing unit configured to edit the response pattern stored in the storage unit based on the editing request, wherein the editing request includes an Object ID (OID) in Simple Network Management Protocol (SNMP) as information indicating a packet to which the printing apparatus responds while being maintained in the power saving mode.

2. The printing apparatus according to claim 1,
wherein the storing unit further stores a return pattern indicating a packet with which the printing apparatus is required to return from the power saving mode to a normal power mode, and
wherein, in a case where a packet that the printing apparatus operating in the power saving mode has received matches the return pattern, the processing unit returns the printing apparatus from the power saving mode to the normal power mode.

3. The printing apparatus according to claim 2,
wherein the storing unit further stores a return pattern indicating a packet with which the printing apparatus is required to return from the power saving mode to a normal power mode and a discard pattern indicating a packet that the printing apparatus is to discard,
wherein, in a case where the packet that the printing apparatus operating in the power saving mode has received matches the return pattern, the processing unit returns the printing apparatus from the power saving mode to the normal power mode, and
wherein, in a case where the packet that the printing apparatus operating in the power saving mode has received matches the discard pattern, the processing unit discards the received packet.

4. A printing apparatus comprising:
a storing unit configured to store a response pattern indicating a packet to which the printing apparatus is capable of responding while being maintained in a power saving mode;
a processing unit configured to, in a case where a packet that the printing apparatus operating in the power saving mode has received matches the response pattern, respond to the received packet while being maintained in the power saving mode;
an acquiring unit configured to acquire a response file that contains a response pattern indicating a packet to which the printing apparatus is capable of responding while being maintained in the power saving mode from a universal serial bus (USB) memory connected to the printing apparatus; and
an editing unit configured to edit the response pattern stored in the storing unit based on the response pattern included in the response file received from the USB memory,
wherein the response pattern included in the response file includes an Object ID (OID) in Simple Network Management Protocol (SNMP) as information indicating a packet to which the printing apparatus responds while being maintained in the power saving mode.

5. The printing apparatus according to claim 4,
wherein the storing unit further stores a return pattern indicating a packet with which the printing apparatus is required to return from the power saving mode to a normal power mode, and
wherein, in a case where a packet that the printing apparatus operating in the power saving mode has received matches the return pattern, the processing unit returns the printing apparatus from the power saving mode to the normal power mode.

6. The printing apparatus according to claim 5,
wherein the storing unit further stores a return pattern indicating a packet with which the printing apparatus is required to return from the power saving mode to a normal power mode and a discard pattern indicating a packet that the printing apparatus is to discard,
wherein, in a case where the packet that the printing apparatus operating in the power saving mode has received matches the return pattern, the processing unit returns the printing apparatus from the power saving mode to the normal power mode, and
wherein, in a case where the packet that the printing apparatus operating in the power saving mode has received matches the discard pattern, the processing unit discards the received packet.

* * * * *